(12) United States Patent
Lee et al.

(10) Patent No.: US 12,723,868 B2
(45) Date of Patent: Sep. 1, 2026

(54) MOLDING THICKNESS INSPECTION SYSTEM WITH IDENTIFIED MOVEABLE ILLUMINANCE SENSORS

(71) Applicant: ELECTRONICS AND TELECOMMUNICATIONS RESEARCH INSTITUTE, Daejeon (KR)

(72) Inventors: Yong Kwi Lee, Daejeon (KR); Hyun Chul Kang, Daejeon (KR); Ji Yeon Son, Daejeon (KR); Young Seog Yoon, Daejeon (KR); Chang-Beom Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 245 days.

(21) Appl. No.: 18/539,848

(22) Filed: Dec. 14, 2023

(65) Prior Publication Data

US 2024/0200931 A1 Jun. 20, 2024

(30) Foreign Application Priority Data

Dec. 16, 2022 (KR) ........................ 10-2022-0176558
Nov. 6, 2023 (KR) ........................ 10-2023-0152164

(51) Int. Cl.
*G01B 11/06* (2006.01)
*B29C 37/00* (2006.01)

(52) U.S. Cl.
CPC .............. *G01B 11/06* (2013.01); *B29C 37/00* (2013.01); *B29C 2037/903* (2013.01); *B29K 2995/0097* (2013.01)

(58) Field of Classification Search
CPC ... G01B 11/06; B29C 37/00; B29C 2037/903; B29K 2995/0097
See application file for complete search history.

(56) References Cited

U.S. PATENT DOCUMENTS 5,684,574 A * 11/1997 Shiokawa ............ G01N 21/314 250/559.28
9,228,826 B2 1/2016 Ryu et al.
(Continued)

FOREIGN PATENT DOCUMENTS

JP 2005-331299 A 12/2005
JP 2014-215153 A 11/2014
(Continued)

OTHER PUBLICATIONS

Office Action of the KR application No. 10-2023-0152164 dated Dec. 15, 2025.

*Primary Examiner* — Rebecca C Bryant
(74) *Attorney, Agent, or Firm* — LRK PATENT LAW FIRM

(57) ABSTRACT

The present invention relates to a molding thickness inspection device, a molding thickness inspection system including the same, and a molding thickness inspection method. The molding thickness inspection system according to an aspect of the present invention includes a molding thickness inspection device in which a plurality of illuminance sensors are installed and which accommodates an inspection target product which is illuminated, and a control device configured to inspect whether a thickness of the inspection target product is abnormal based on illuminance data measured by the plurality of illuminance sensors.

8 Claims, 13 Drawing Sheets

(56) References Cited

U.S. PATENT DOCUMENTS

| | | | | |
|---|---|---|---|---|
| 9,534,889 | B2 | 1/2017 | Kim et al. | |
| 9,890,003 | B2 * | 2/2018 | Nakayama | B65H 7/06 |
| 11,486,694 | B2 | 11/2022 | Laman | |
| 2002/0107650 | A1 * | 8/2002 | Wack | G03F 7/70708 702/81 |
| 2021/0364282 | A1 | 11/2021 | Irie et al. | |
| 2022/0152900 | A1 * | 5/2022 | Nakamura | B29C 45/766 |

FOREIGN PATENT DOCUMENTS

| | | | |
|---|---|---|---|
| KR | 20-0268949 | Y1 | 3/2002 |
| KR | 10-1872504 | B1 | 6/2018 |

* cited by examiner

●: MEASUREMENT POINT

100

10a

10b (a)

(b)

MOLDING THICKNESS INSPECTION SYSTEM WITH IDENTIFIED MOVEABLE ILLUMINANCE SENSORS

CROSS-REFERENCE TO RELATED APPLICATIONS

The present application claims priority under 35 U.S.C. § 119(a) to Korean Application No. 10-2022-0176558, filed on Dec. 16, 2022 in the Korean Intellectual Property Office and Korean Application No. 10-2023-0152164 filed on Nov. 6, 2023 in the Korean Intellectual Property Office, which are hereby incorporated by reference for all purposes as if set forth herein.

BACKGROUND

1. Field of the Invention

The present invention relates to a molding thickness inspection device for allowing a defect of a molding thickness occurring in a molding process to be inspected, a molding thickness inspection system including the same, and a molding thickness inspection method.

2. Description of Related Art

Many molding processes including plastic molding, steel plate molding, and shape molding are performed in small, medium, and large-scale factories. During the molding processes, a shape can be distorted due to thickness after molding, deformation can occur during a post-processing process, and a product can be damaged during a forming process. Therefore, when a defect occurs due to thickness in a subsequent process, there are many cases in which even parts input after being subjected to the subsequent process are all damaged and lost. The cause of the defect is a current state of an input material. A material, which is positioned at the beginning, has an exposed surface larger than that of a material piled thereunder and thus is greatly affected by the surrounding temperature, and thus a shape thereof is more likely to be deformed during thermal forming. In this way, the temperature and humidity around the material can also affect the material, and thus there is a possibility that defects occur.

However, currently, operators inspect quality by manually tapping the product and listening to the sound of the product to determine whether a thickness is normal. Thus, the determination of the quality is extremely subjective rather than objective. Therefore, greater damage is caused in subsequent processes in a factory.

SUMMARY OF THE INVENTION

The present invention is directed to providing a molding thickness inspection device for allowing a defect of a molding thickness occurring in a molding process to be inspected, a molding thickness inspection system including the same, and a molding thickness inspection method.

According to an aspect of the present invention, there is provided a molding thickness inspection system including a molding thickness inspection device in which a plurality of illuminance sensors are installed and accommodates an inspection target product which is illuminated, and a control device configured to inspect whether a thickness of the inspection target product is abnormal based on illuminance data measured by the plurality of illuminance sensors.

When the illuminance data is received from the plurality of illuminance sensors through a communication module, the control device may compare the illuminance data with a preset reference illuminance range, when the illuminance data is in the preset reference illuminance range, may determine that the thickness of the inspection target product is normal, and when the illuminance data is out of the reference illuminance range, may determine that the thickness of the inspection target product is defective.

The illuminance data may include illuminance sensor identification information and an illuminance value, and the processor may acquire a reference illuminance range at a position corresponding to the illuminance sensor identification information from a look-up table in which a reference illuminance range is set according to a position for each product, and compare the illuminance value with the acquired reference illuminance range to inspect a thickness for each position of the inspection target product.

When it is determined that the thickness of the inspection target product is defective, the processor may output thickness abnormality occurrence information of the inspection target product through an output module.

When the inspection target product is selected through an input module, the processor may acquire measurement point information corresponding to the selected inspection target product and transmit a control signal for moving the illuminance sensor to a position corresponding to the measurement point information.

The molding thickness inspection device may move each illuminance sensor to a corresponding position according to the control signal from the control device.

According to another aspect of the present invention, there is provided a molding thickness inspection device including a main body case providing an accommodation space in which an inspection target product is accommodated, a plurality of illuminance sensors provided in the accommodation space to measure an illuminance value of light transmitted from the inspection target product, a sensor frame provided inside the main body case and configured to guide the illuminance sensor to be position-moved, and a movement prevention entry guide provided in the main body case and configured to guide the inspection target product to enter the accommodation space such that the inspection target product is prevented from moving in a width direction of the accommodation space.

The main body case may be formed in a rectangular parallelepiped shape and may include a pair of side surface portions vertically disposed to be spaced apart from each other, an upper surface portion and a lower surface portion horizontally disposed at an upper end and a lower end of the side surface portions, a rear surface portion vertically disposed at a rear end of the side surface portions, and a front surface portion vertically disposed at a front end of the side surface portions, the front surface portion includes an opening/closing door configured to open and close a front surface, and the side surface portion and the rear surface portion include one or more detachable covers.

The sensor frame may include a pair of vertical frames vertically disposed on a rear inner surface of the main body case and a plurality of horizontal frames which are horizontally disposed to be spaced apart from each other on the rear inner surface of the main body case and at which one or more illuminance sensors are installed, the vertical frame may include a vertical guide rail provided in a longitudinal direction, and the horizontal frame may be connected to the vertical frame through a slider inserted into the vertical guide rail of the vertical frame to slide and may vertically move through the slider.

The horizontal frame may include a horizontal guide rail provided in a longitudinal direction and a sensor position movement support inserted into a groove of the horizontal guide rail to slide, and the sensor position movement support may include a slide member inserted into the groove of the horizontal guide rail to slide, an angle change connector hinge-coupled to the slide member and configured to support the illuminance sensor to be laterally moved, and an illuminance sensor portion provided with the illuminance sensor, hinge-coupled to the angle change connector, and configured to provide an elastic force such that the illuminance sensor comes into close contact with a surface of the inspection target product.

The movement prevention entry guide may include a pair of contact bars which are disposed in the accommodation space to face each other and are in contact with a peripheral surface of the inspection target product, an entry guide bar provided with the illuminance sensor and inclinedly connected to each of the contact bars to guide the inspection target product to enter between the contact bars, and an interval adjustment connector configured to connect the contact bars to the main body case to be supported on the main body case such that an interval between the contact bars is adjustable.

The entry guide bar may include a guide rail provided in a longitudinal direction, and a position-variable support provided with the illuminance sensor and inserted into a groove of the guide rail to slide, and the position-variable support may include a slide member inserted into a groove of the guide rail to slide, an angle adjustment connector protruding from the slide member and connected to adjust an angle of the illuminance sensor, and an illuminance sensor portion provided with the illuminance sensor and hinge-coupled to the angle adjustment connector to adjust the angle of the illuminance sensor.

The interval adjustment connector may include an operation knob rotatably provided on a peripheral surface of the main body case, a rotation support provided in the accommodation space to rotatably support the contact bar, and an interval adjustment guide configured to guide the rotation support to move in a width direction of the accommodation space as the operation knob rotates.

The rotation support may support the contact bar to be slidable by a slide movement guide, and the slide movement guide may include a slide member slidably inserted into a slide rail groove of the contact bar and hinge-coupled to the rotation support.

When at least two inspection target products are accommodated in the main body case, the main body case may include a compartment entry guide configured to guide the inspection target products to enter the accommodation space such that the accommodation space are partitioned in a height direction.

The compartment entry guide may include a compartment guide frame provided in the accommodation space, a compartment sensor frame provided with the illuminance sensor, connected to the compartment guide frame, and configured to guide the illuminance sensor such that a position of the illuminance sensor is moved, a roller member rotatably supported on the compartment guide frame to guide a movement of the inspection target product entering the accommodation space, and a height adjustment connector configured to connect the compartment guide frame and the main body case such that the compartment guide frame is adjustable through a rotation operation by an external force.

The compartment sensor frame may include a guide rail provided in a longitudinal direction, and at least two position-variable supports configured to move the illuminance sensor through the guide rail, and the position-variable support may include a first position-variable support configured to measure illuminance of light transmitted from a lower surface of the inspection target product positioned at an upper side and accommodated at an upper portion of the compartment entry guide, and a second position-variable support configured to measure illuminance of light transmitted from an upper surface of the inspection target product positioned at a lower side and accommodated at a lower portion of the compartment entry guide.

The height adjustment connector may include a pair of fixing members at both sides of the main body case in a width direction to be spaced apart from each other, an elevation guide shaft provided at the fixing member and passing through the compartment guide frame to guide vertical movement of the compartment guide frame, and a rotation elevation support configured to support the compartment guide frame such that the compartment guide frame is vertically moved through a rotation operation by an external force and a position thereof is fixed when the external force is removed.

According to still another aspect of the present invention, there is provided a molding thickness inspection method including receiving, by a control device, illuminance data from each of a plurality of illuminance sensors of a molding thickness inspection device in which an inspection target product, which is illuminated, is accommodated, and inspecting, by the control device, whether a thickness of the inspection target product is abnormal based on the illuminance data.

In the inspecting, the control device may compare the illuminance data with a preset reference illuminance range, when the illuminance data is in the preset reference illuminance range, may determine that the thickness of the inspection target product is normal, and when the illuminance data is out of the reference illuminance range, may determine that the thickness of the inspection target product is defective.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a diagram for describing a molding thickness inspection system according to one embodiment of the present invention;

FIGS. 6A to 6C are example views for describing the interior of the molding thickness inspection device according to one embodiment of the present invention;

FIG. 10 shows example views for describing a position of an illuminance sensor according to a measurement point according to one embodiment of the present invention.

DETAILED DESCRIPTION OF EXEMPLARY EMBODIMENTS

Figure 1:
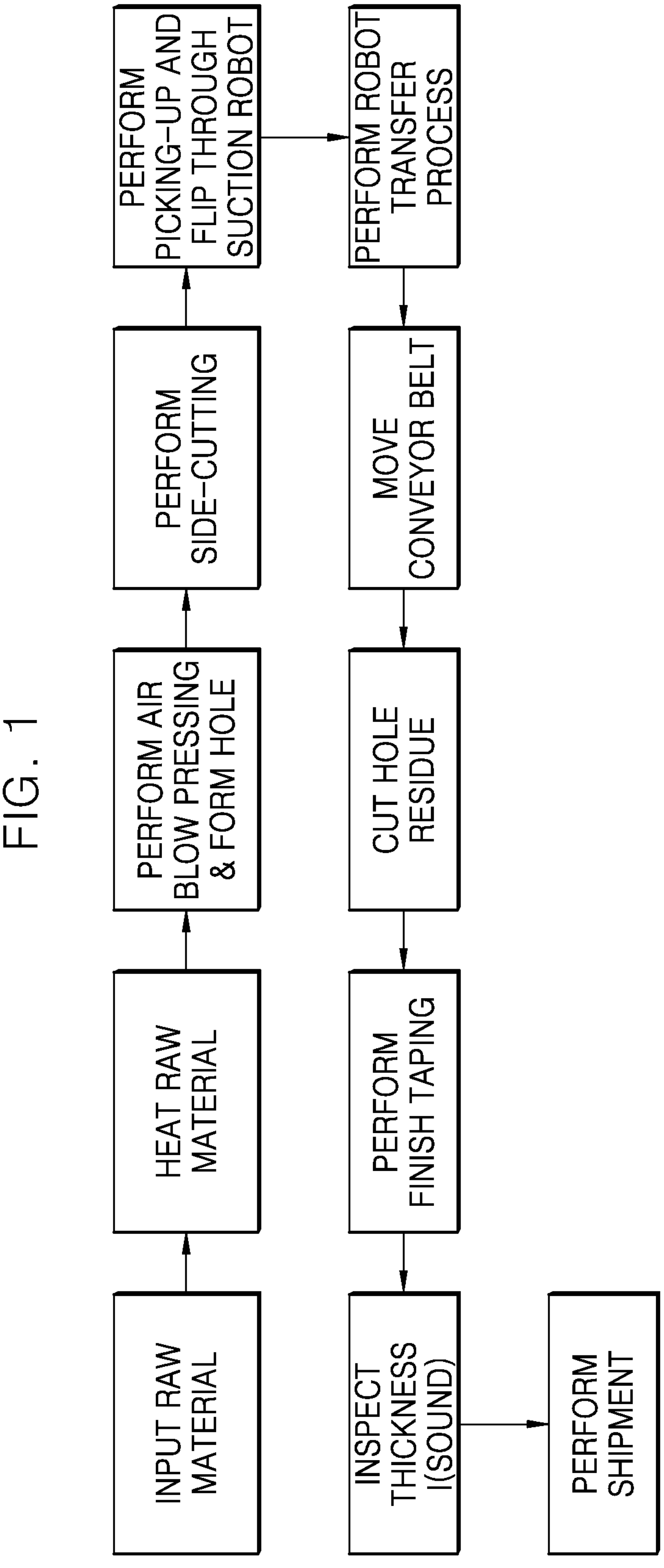
FIG. 1 is an example diagram for describing a plastic molding process sequence.

Hereinafter, embodiments of a molding thickness inspection device, a molding thickness inspection system including the same, and a molding thickness inspection method according to one embodiment of the present invention will be described.

The accompanying drawings are not necessarily to scale and in some instances, proportions may have been exaggerated in order to clearly illustrate features of the embodiments. Further, terms to be described below are terms defined in consideration of functions in the present invention and thus may vary according to intentions or customs of users and operators. Accordingly, the definitions of such terms should be made based on the content throughout the specification.

Hereinafter, embodiments of the present invention will be described in detail with reference to the accompanying drawings so that those skilled in the art may easily practice the present invention. However, the present invention may be implemented in various forms and is not limited to the embodiments described herein. In the accompanying drawings, portions unrelated to the description will be omitted in order to obviously describe the present invention, and similar reference numerals will be used to describe similar portions throughout the present specification.

Throughout the specification, unless explicitly described to the contrary, the word "comprise" or "include" and a variation such as "comprising" or "including" will be understood to imply the inclusion of stated elements but not the exclusion of any other elements.

Implementations described herein may be implemented in, for example, a method or process, an apparatus, a software program, a data stream, or a signal. Although discussed only in the context of a single form of implementation (e.g., discussed only as a method), implementations of the discussed features may also be implemented in other forms (for example, an apparatus or a program). The apparatus may be implemented in suitable hardware, software, firmware, and the like. A method may be implemented in an apparatus such as a processor, which is generally a computer, a microprocessor, an integrated circuit, a processing device including a programmable logic device, or the like.

FIG. 1 is an example diagram for describing a plastic molding process sequence.

Referring to FIG. 1, when a raw material is input, the input raw material is loaded into a heating furnace. The raw material heated in the heating furnace is placed on a wind-blown press to mold a shape. Afterwards, side-cutting is performed on residues protruding from the side of the molded product, and a vertical position of the product is flipped through a suction robot. Next, a robot transfers the product, of which the vertical position is flipped, to another position and places the product on a conveyor belt. Then, an operator inspects the quality of the product and performs an additional operation. In this case, the operator cuts a hole residue, performs finish taping, taps the product with a hand to check whether thicknesses of surfaces of the product are normal, and ships the product.

However, operators inspect the quality by manually tapping a product and listen to the sound of the product to determine whether a thickness is normal. Thus, determination of the quality is extremely subjective rather than objective by an operator. Further, additional damage is caused in subsequent processes in a factory.

Accordingly, the present invention proposes a technology for preventing a shape from being distorted due to thickness after molding in a plastic molding process or preventing deformation from occurring during a post-processing process, objectifying a quality inspection, and converting an inspection result into data.

The present invention relates to a technology for determining whether a thickness of a product is normal or defective by illuminating the inside of the product and checking an illuminance value of light transmitted from each point using an illuminance sensor outside the product.

The present invention relates to a technology in which, when plastic, which has a thickness that is appropriate to transmit light, is molded, one surface of a product is illuminated, and an illuminance value of light transmitted from each point of a surface opposite to the one surface is checked using an illuminance sensor to compare the checked illuminance value with a preset reference illuminance value for each thickness, thereby determining whether the thickness is normal or defective.

Figure 2:
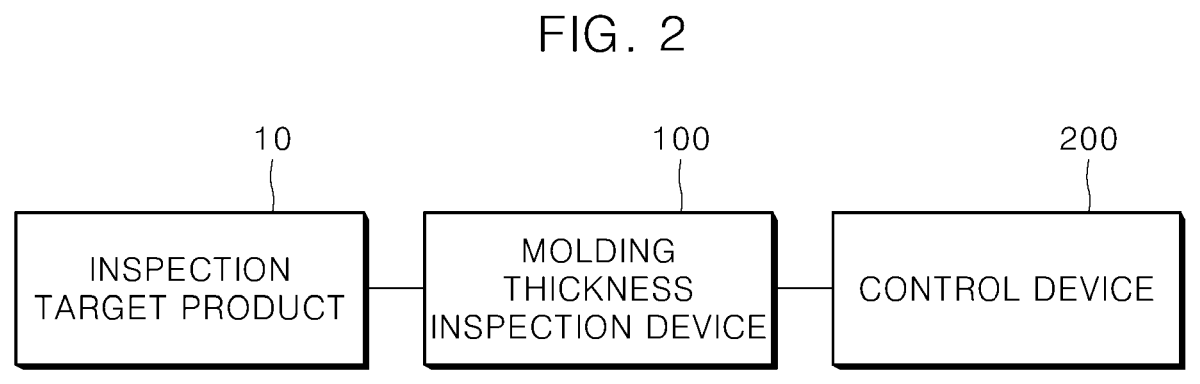

FIG. 2 is a diagram for describing a molding thickness inspection system according to one embodiment of the present invention.

Referring to FIG. 2, the molding thickness inspection system according to one embodiment of the present invention includes an inspection target product 10, a molding thickness inspection device 100, and a control device 200.

The inspection target product 10 may be a product subjected to a robot transfer process and may be a molded product capable of transmitting light. For example, the inspection target product 10 may be a plastic-molded product having a thickness capable of transmitting light. The inspection target product 10, which is molded through a molding process, is illuminated, and the illuminated inspection target product 10 may be accommodated in the molding thickness inspection device 100. That is, when a robot transfer process is completed, a light instrument moves into the inspection target product 10, and after the light instrument moves into the inspection target product 10, the light instrument may be turned on.

The molding thickness inspection device 100 may include a plurality of illuminance sensors 300 installed therein and may accommodate the illuminated inspection target product 10. The molding thickness inspection device 100 may measure an amount (illuminance value) of light transmitted from the inspection target product 10 accommodated therein using the illuminance sensor 300.

The number and position of illuminance sensors 300 installed in the molding thickness inspection device 100 may be changed by an operator or a user. That is, the molding thickness inspection device 100 may be designed to allow the addition or movement of the illuminance sensor 300, and the illuminance sensor 300 may have a characteristic of being movable to a position desired by an operator or a user.

The molding thickness inspection device 100 may transmit illuminance data including an illuminance value measured through the illuminance sensor 300 to the control device 200. Here, the illuminance data may include illuminance sensor identification information, an illuminance value, and the like.

The molding thickness inspection device 100 will be described in detail with reference to FIGS. 4 to 10.

The control device 200 may acquire measurement point information corresponding to the inspection target product 10 and may control the illuminance sensors 300 of the molding thickness inspection device 100 to move to a position corresponding to the measurement point information.

In addition, the control device 200 may receive the illuminance data from the molding thickness inspection device 100 and may inspect whether a thickness of the inspection target product 10 is abnormal based on the illuminance data.

The control device 200 may be implemented using an edge device, a server, or the like.

The control device 200 will be described in detail with reference to FIG. 3.

Figure 3:
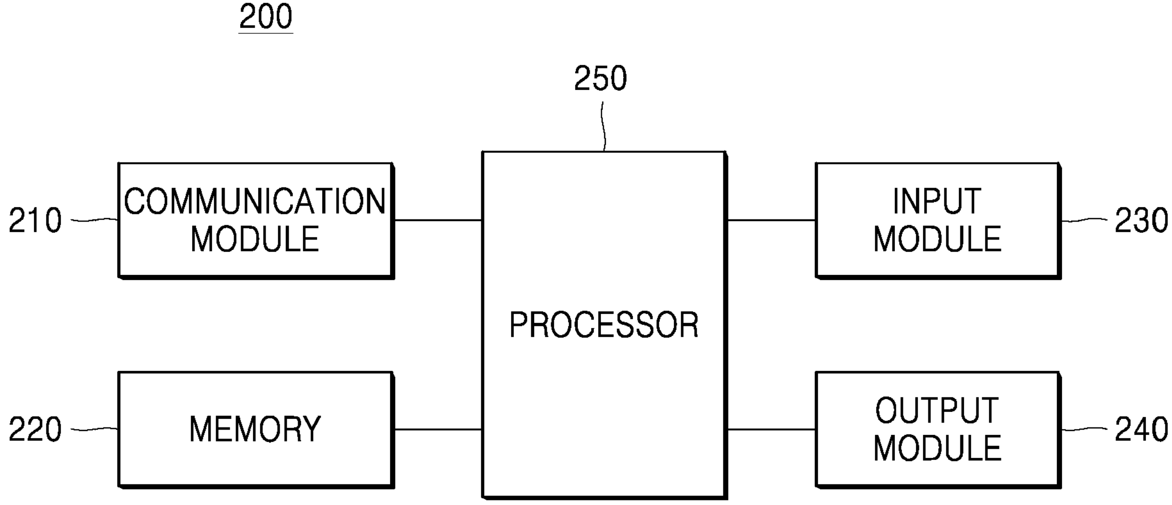
FIG. 3 is a schematic block diagram illustrating a configuration of a control device according to one embodiment of the present invention.

FIG. 3 is a schematic block diagram illustrating a configuration of a control device according to one embodiment of the present invention.

Referring to FIG. 3, the control device 200 according to one embodiment of the present invention includes a communication module 210, a memory 220, an input module 230, an output module 240, and a processor 250.

The communication module 210 may provide an interface necessary to provide a transmission signal or a reception signal in the form of packet data between the control device 200 and the molding thickness inspection device 100 in conjunction with a communication network. In particular, the communication module 210 may transmit and receive various types of information such as illuminance data. In addition, the communication module 210 may be a device that includes hardware and software necessary to transmit or receive a signal such as a control signal or a data signal through wired or wireless connections with other network devices. Furthermore, the communication module 210 may be implemented in various forms such as a short-distance communication module, a wireless communication module, a mobile communication module, and a wired communication module.

The memory 220 is a component that stores data related to the operation of the control device 200. In particular, the memory 220 may store a program (application or applet) that allows whether a thickness of the inspection target product 10 is abnormal to be inspected based on illuminance data, and stored information may be selected as needed by the processor 250. That is, the memory 220 stores various types of data generated during the execution of an operating system or application (program or applet) for driving the control device 200. In this case, the memory 220 refers to a non-volatile storage device that continues to maintain stored information even when power is not supplied, and a volatile storage device that requires power to maintain the stored information.

The input module 230 may be provided to input information necessary to determine whether a thickness of the inspection target product 10 is abnormal and may receive a type or the like of an inspection target product.

The input module 230 may include, for example, a keyboard, a mouse, a touchpad, a touch panel, a (digital) pen sensor, a key, and the like. Here, the key may include, for example, a physical button, an optical key, or a keypad.

The output module 240 may output thickness abnormality occurrence information of the inspection target product 10 or the like under the control of the processor 250. The output module 240 may be, for example, a liquid crystal display (LCD), a light-emitting diode (LED) display, an organic light-emitting diode (OLED) display, a microelectromechanical system (MEMS) display, or an electronic paper display. In addition, the output module 240 may include a speaker and the like.

Meanwhile, in the embodiment of the present invention, it has been described that the input module 230 and the output module 240 are implemented separately, but the input module 230 and the output module 240 may be implemented as an integrated type.

In the present embodiment, the processor 250 may be a device that inspects whether a thickness of the inspection target product 10 is abnormal (defective), may be implemented as a central processing unit (CPU) or a system-on-chip (SoC), may control a plurality of hardware or software components connected to the processor 250 by running an operating system or application, and may perform processing and calculating on various types of data. The processor 250 may be configured to execute at least one instruction stored in the memory 220 and store execution result data in the memory 220.

The processor 250 may acquire measurement point information corresponding to the inspection target product 10 and control the illuminance sensors 300 of the molding thickness inspection device 100 to move to a position corresponding to the measurement point information.

In addition, the processor 250 may receive illuminance data from the molding thickness inspection device 100 and inspect whether a thickness of the inspection target product 10 is abnormal based on the received illuminance data.

Hereinafter, an operation in which the processor 250 inspects whether a thickness of the inspection target product 10 is abnormal will be described in detail.

When the inspection target product 10 is selected (or input) through the input module 230, the processor 250 may acquire measurement point information corresponding to the inspection target product 10 and control the illuminance sensors of the molding thickness inspection device 100 to move to a position corresponding to the measurement point information.

That is, since the memory 220 stores measurement point information for each inspection target product 10, when the inspection target product 10 is selected, the processor 250 may acquire measurement point information corresponding to the selected inspection target product 10. Then, the processor 250 may control the illuminance sensors 300 to move to a position corresponding to the measurement point information. In this case, the illuminance sensors may be moved automatically or manually.

When the illuminance sensors 300 move automatically, the processor 250 may transmit a position movement control signal including measurement point information to the molding thickness inspection device 100. Here, the position movement control signal may be a control signal for moving the illuminance sensor 300 to a position corresponding to the measurement point information. The molding thickness inspection device 100 that receives the position movement control signal may move the illuminance sensors 300 to the measurement point included in the measurement point information. In this case, the molding thickness inspection device 100 may be provided with an actuator (not shown) including a motor and a gear to move each illuminance sensor 300, and the movement of the illuminance sensor 300 may be controlled by the control device 200.

When the illuminance sensors 300 are moved manually, the processor 250 may output measurement point information through the output module 240. Then, an operator may move the illuminance sensors 300 of the molding thickness inspection device 100 to a measurement point included in the measurement point information.

When the position movement of the illuminance sensor 300 is completed, the illuminance sensor 300 may measure an illuminance value (amount) of light transmitted from the inspection target product 10 and transmit illuminance data including the measured illuminance value to the control device 200.

The processor 250 may receive the illuminance data measured by the illuminance sensors 300 of the molding thickness inspection device 100 through the communication module 210. Here, the illuminance data may include illuminance sensor identification information, an illuminance value, and the like.

When the illuminance data is received, the processor 250 may analyze the illuminance data to determine normal data and abnormal (defective) data and may determine a thickness defect from the abnormal data. In this case, the processor 250 may analyze the illuminance data using rule-based data analysis, artificial intelligence (AI) algorithm analysis, or the like.

The processor 250 may compare the illuminance data with a preset reference illuminance range and may determine whether a thickness of the inspection target product 10 is abnormal based on a comparison result.

The inspection target product 10 is a molded product having a thickness that is appropriated to transmit light, and an amount (illuminance) of light transmitted varies according to the thickness. Therefore, when the illuminance value is set according to the thickness, it is possible to determine whether the thickness of the inspection target product 10 is abnormal using illuminance.

Accordingly, the memory 220 according to one embodiment of the present invention stores a look-up table in which a reference illuminance range is preset according to a measurement position for each inspection target product. Accordingly, the processor 250 may acquire a reference illuminance range of a position corresponding to illuminance sensor identification information included in illuminance data from the look-up table. Then, the processor 250 may compare an illuminance value included in the illuminance data with the reference illuminance range. When the illuminance value is in the reference illuminance range, the processor 250 may determine that a thickness at the corresponding position of the inspection target product 10 is normal. When the illuminance value is out of the reference illuminance range, the processor 250 may determine that the thickness at the corresponding position of the inspection target product 10 is defective.

In this way, the processor 250 may compare an illuminance value for each inspection target product 10 with a reference illuminance range set at a corresponding position, thereby inspecting whether a thickness for each position of the inspection target product 10 is abnormal.

When it is determined whether the thickness of the inspection target product 10 is abnormal, the processor 250 may output thickness abnormality occurrence information of the inspection target product 1 through the output module 240.

For example, the processor 250 may display a position, at which a defect occurs, through the output module 240. Here, the position at which the defect occurs may be a position of the illuminance sensor 300 that measures an illuminance value at which the defect occurs. Accordingly, the processor 250 may display normal, defective, or the like for each position of the illuminance sensor. For example, when a thickness is normal, the processor 250 may display a corresponding position in green. When a thickness is defective, the processor 250 may display a corresponding position in red.

When the thickness of the inspection target product 10 is abnormal (defective), the processor 250 may notify a manager of defect occurrence information. Here, the defect occurrence information may include a position at which a defect occurs, a thickness error, or the like. That is, on a monitoring screen of an operator, the processor 250 may display a position at which an error occurs due to thickness, and how much of the thickness error occurs to cause a defect.

The operator who confirms the defect occurrence information rechecks whether the inspection target product 10 is abnormal to process a defective product.

Figure 4:
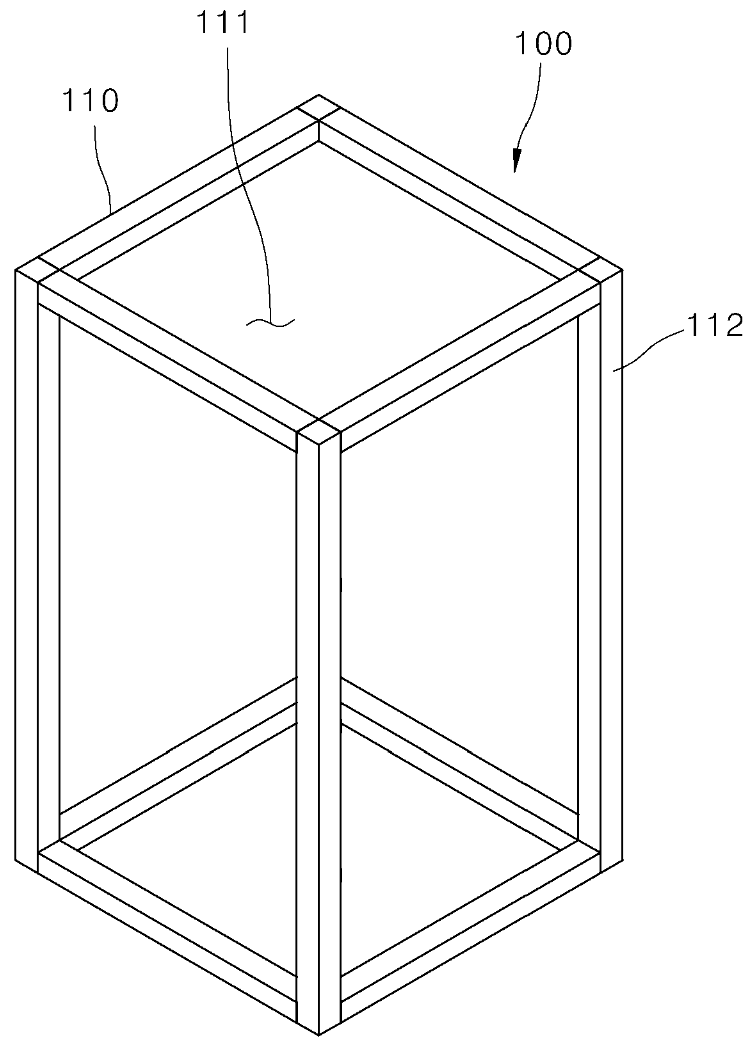
FIG. 4 is a perspective view illustrating a molding thickness inspection device according to one embodiment of the present invention.
Figure 5:
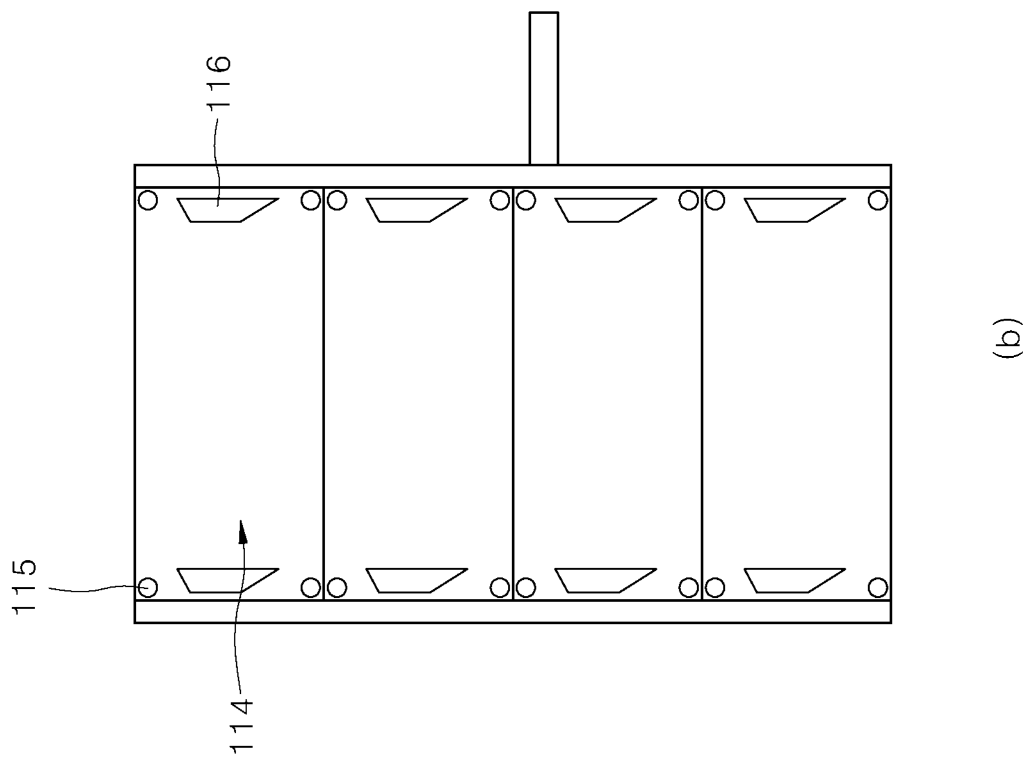
FIG. 5 is a perspective view illustrating an external shape of the molding thickness inspection device according to one embodiment of the present invention.
Figure 5:
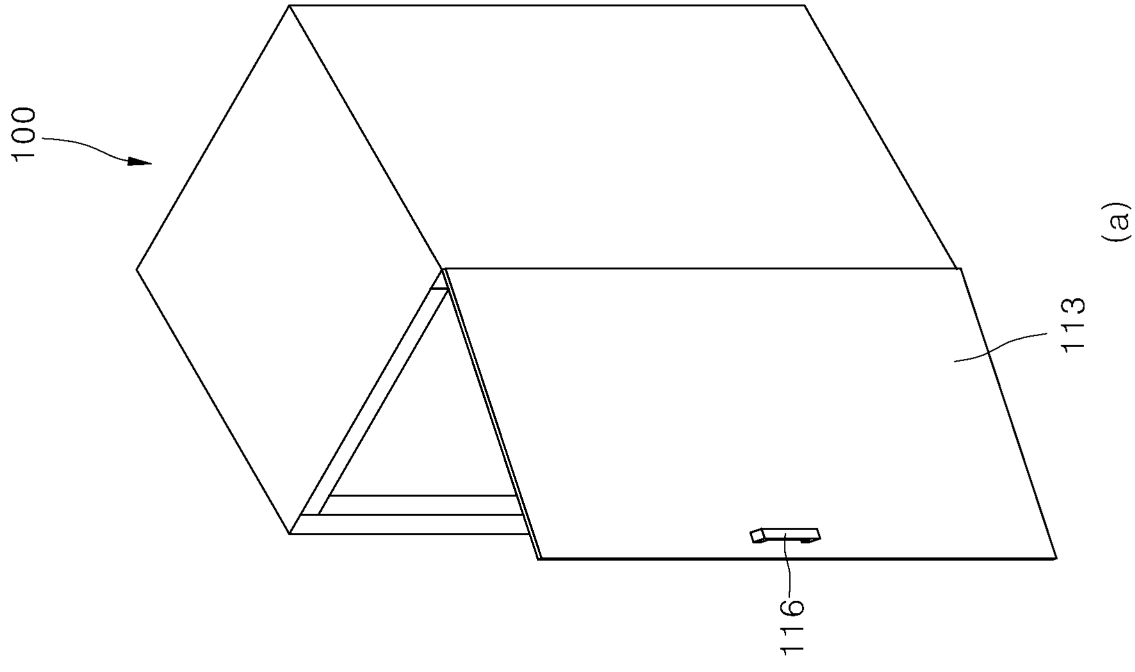
Figure 6A:
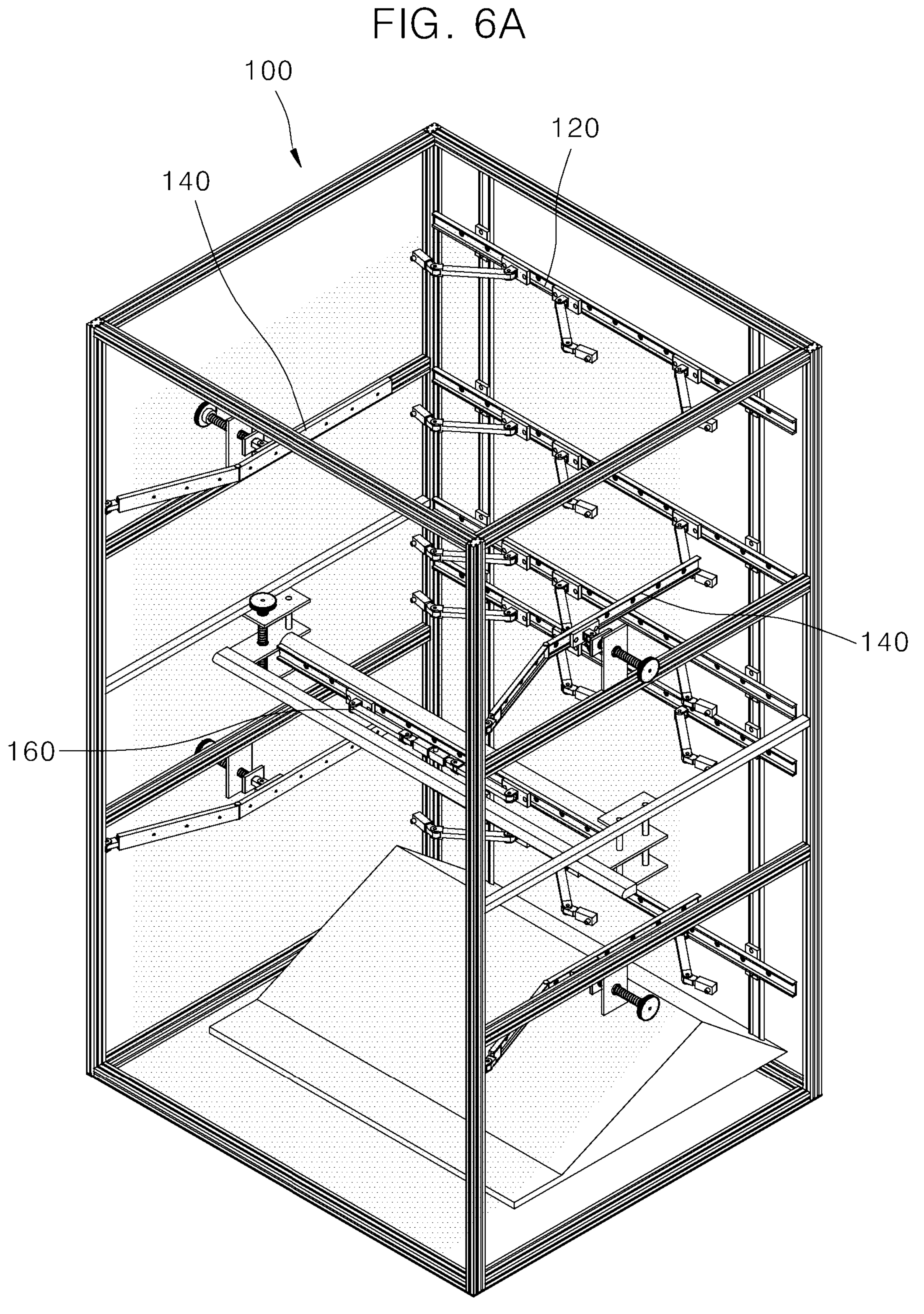
Figure 6B:
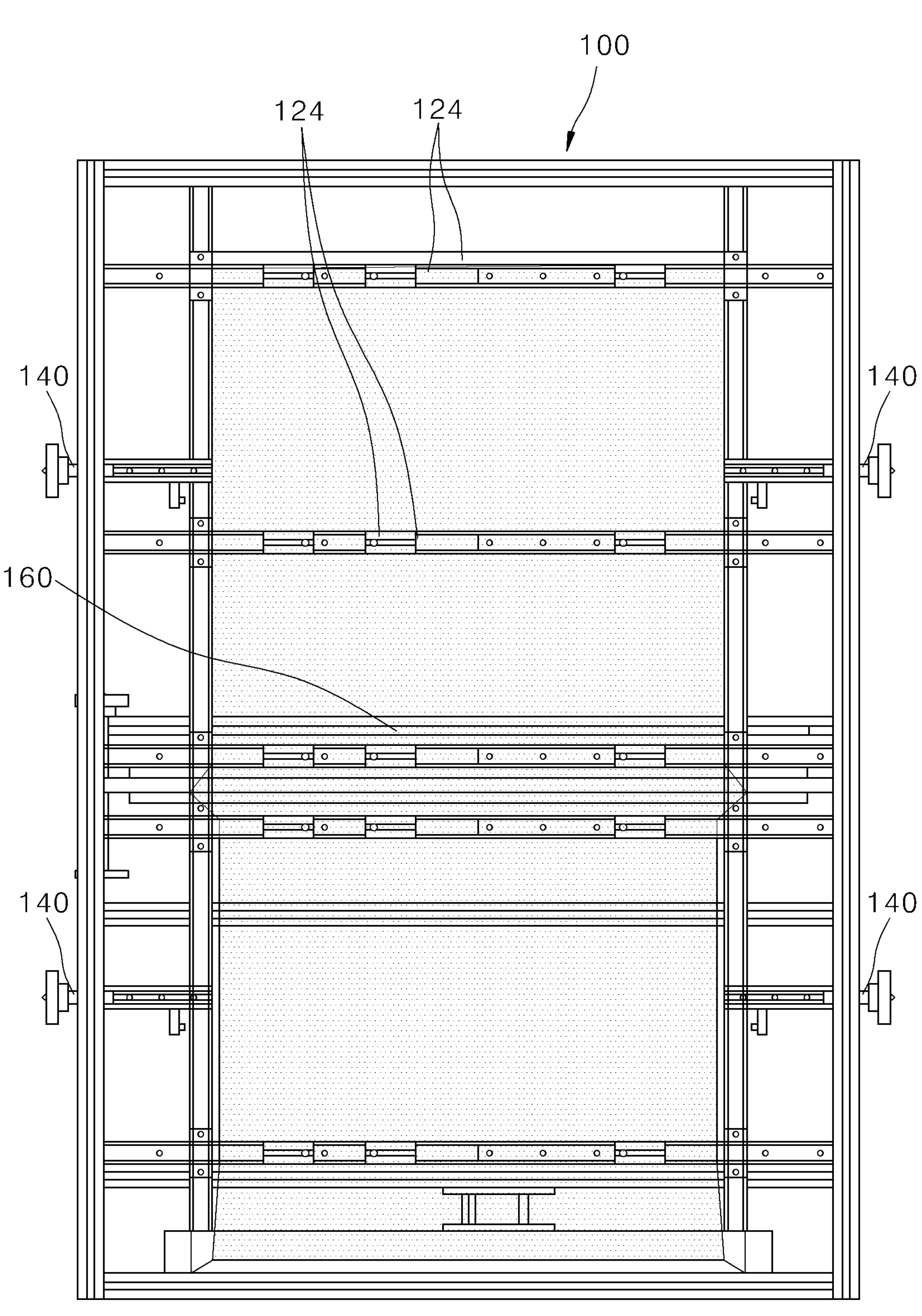
Figure 6C:
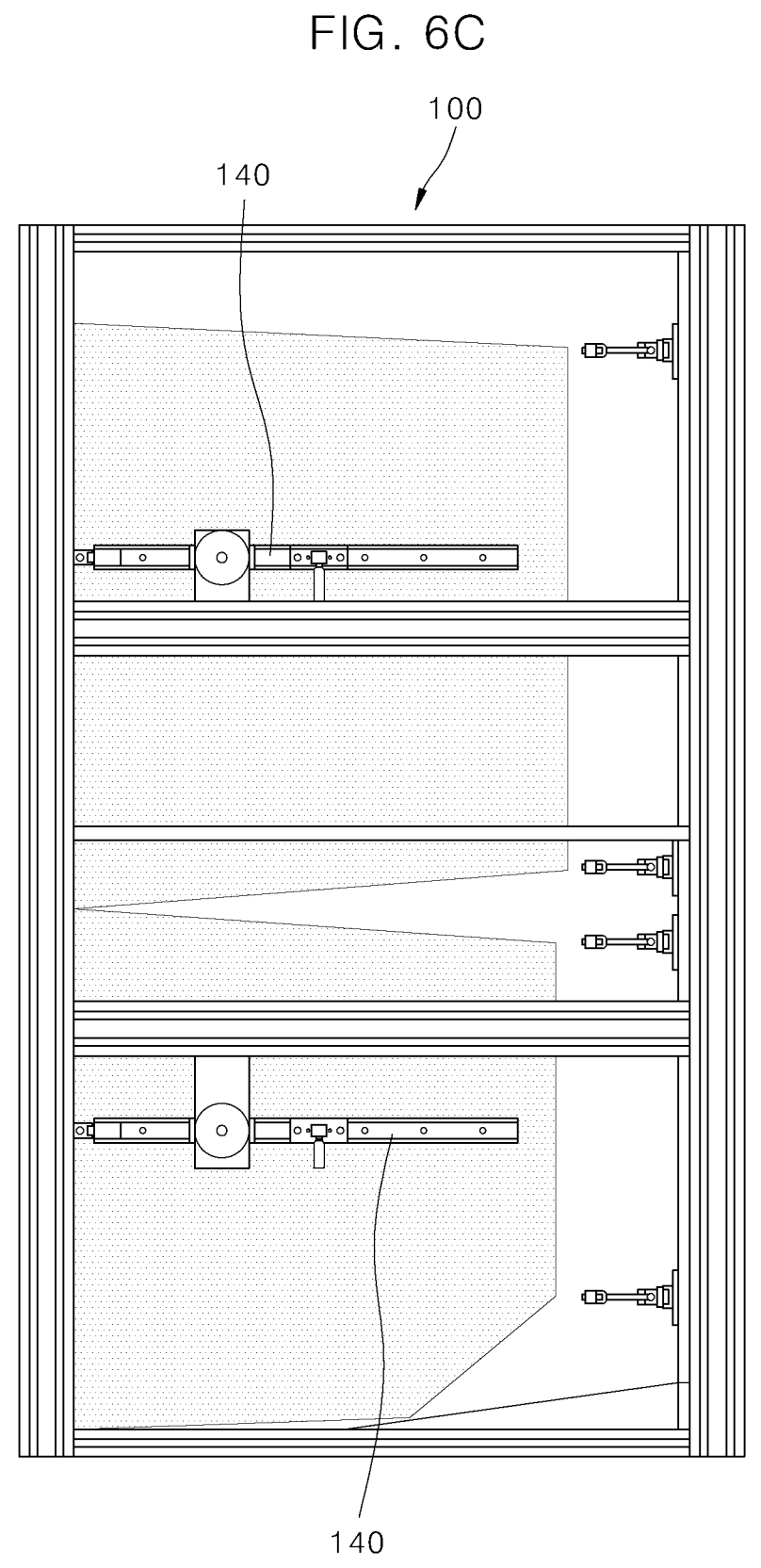
Figure 7:
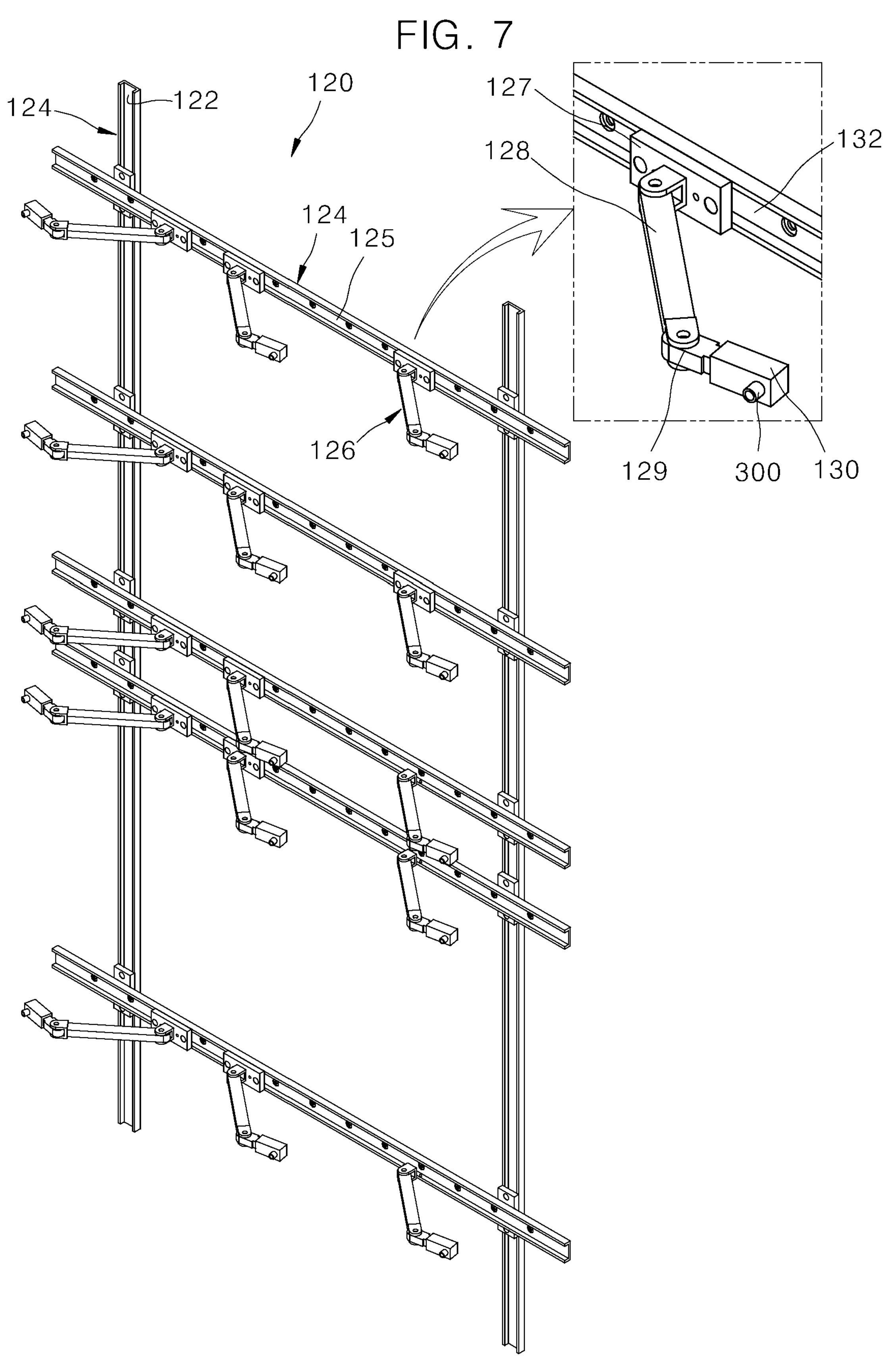
FIG. 7 is an example view for describing a sensor frame shown in FIGS. 6A to 6C.
Figure 8:
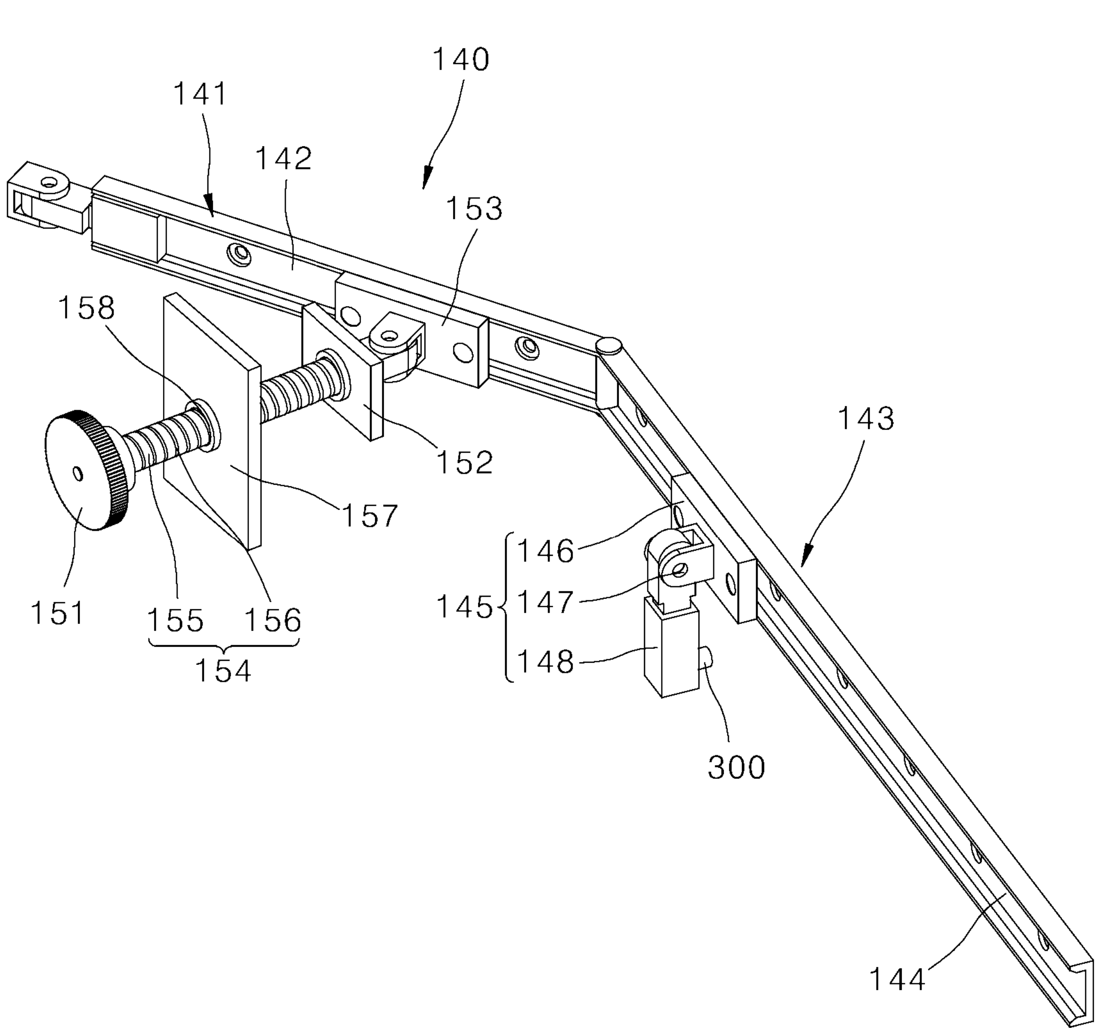
FIG. 8 is an example view for describing a movement prevention entry guide shown in FIGS. 6A to 6C.
Figure 9:
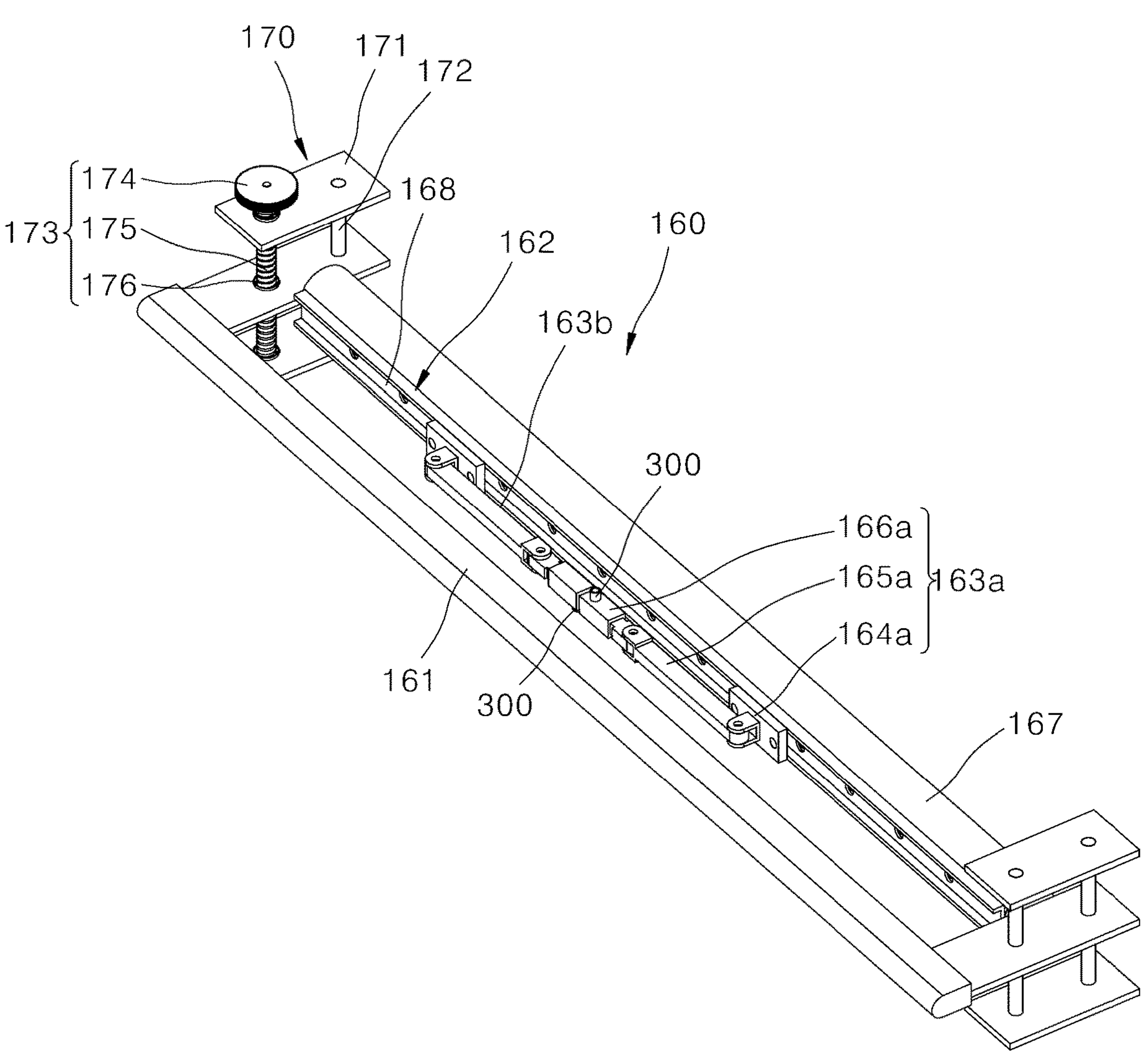
FIG. 9 is an example view for describing a compartment entry guide shown in FIGS. 6A to 6C.
Figure 10:
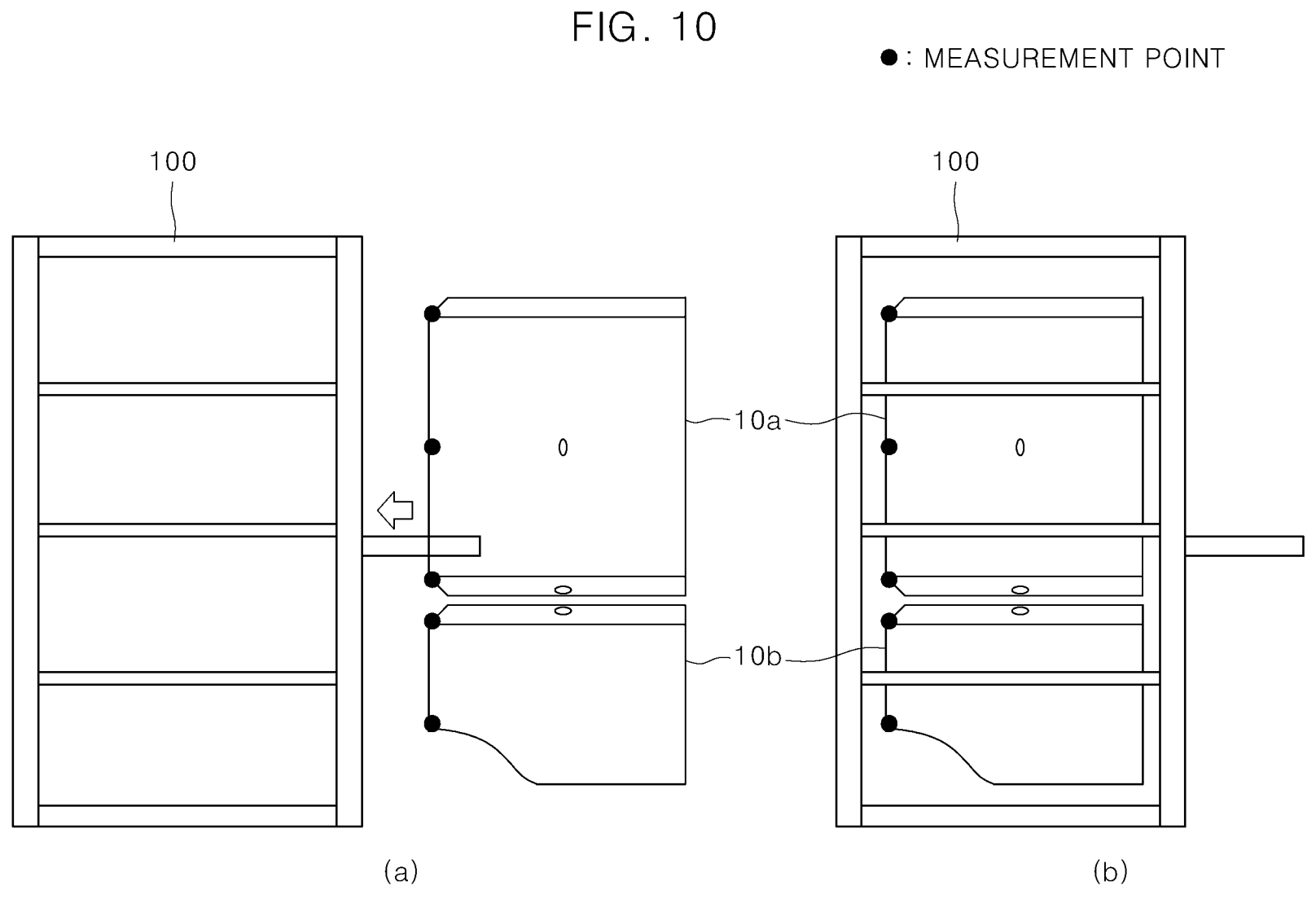

FIG. 4 is a perspective view illustrating a molding thickness inspection device according to one embodiment of the present invention. FIG. 5 is a perspective view illustrating an external shape of the molding thickness inspection device according to one embodiment of the present invention. FIGS. 6A to 6C are example views for describing the interior of the molding thickness inspection device according to one embodiment of the present invention. FIG. 7 is an example view for describing a sensor frame shown in FIGS. 6A to 6C. FIG. 8 is an example view for describing a movement prevention entry guide shown in FIGS. 6A to 6C. FIG. 9 is an example view for describing a compartment entry guide shown in FIGS. 6A to 6C. FIG. 10 shows example views for describing a position of an illuminance sensor according to a measurement point according to one embodiment of the present invention.

Referring to FIGS. 4 to 10, a molding thickness inspection device 100 according to one embodiment of the present invention may include a main body case 110, a sensor frame 120, and a movement prevention entry guide 140.

The main body case 110 may form an accommodation space 111 in which an inspection target product 10 is accommodated.

The main body case 110 may be implemented in a rectangular parallelepiped shape.

The main body case 110 may include a pair of side surface portions vertically disposed to be spaced apart from each other, an upper surface portion and a lower surface portion horizontally disposed at upper ends and lower ends of the side surface portions, a rear surface portion vertically disposed at rear ends of the side surface portions, and a front surface portion vertically disposed at front ends of the side surface portions.

Support members 112 of the side surface portion, the upper surface portion, the lower surface portion, the rear surface portion, and the front surface portion may be coupled and fixed to each other using known fixing members (not shown) such as screws. Here, the support members may be implemented using a metal material or the like.

An opening/closing door 113 that opens and closes a front surface may be installed at the front surface portion as shown in FIG. 5A. The inspection target product 10 may be input to the molding thickness inspection device 100 through the opening/closing door 113. A handle may be provided to be coupled and fixed to a front surface of the opening/closing door 113 through a known method or scheme. Here, the shape of the handle is not limited to the example in the drawing, and various known shapes may be applied. The opening/closing door may be made of a black material or a material that forms a dark room to prevent light from entering the molding thickness inspection device 100.

In addition, a shelf (not shown) may be installed at the front surface portion to elevate the inspection target product 10, equipment, or the like.

One or more detachable covers 114 which are attachable or detachable may be installed at the side surface and rear surface portions. The detachable cover 114 may include a cover plate in the form of a magnet 115, and the cover plate is provided with a handle 116 so that an operator can easily attach or detach the detachable cover 114. Here, the shape of the handle 116 is not limited to the example in the drawing, and various known shapes may be applied. The detachable cover 114 may be made of a black material or a dark material to prevent light from entering the molding thickness inspection device 100.

One or more detachable covers 114 may be vertically installed. For example, four detachable covers 114 may be provided as shown in FIG. 5. Referring to FIG. 5B, each detachable cover 114 is attached by a magnet 115, and the handle 116 may be provided at the detachable cover 114.

A plurality of illuminance sensors 300 may be installed in the accommodation space 111 of the main body case 110 to measure an amount (illuminance) of light transmitted from the inspection target product 10.

To this end, as shown in FIGS. 6A to 6C, the sensor frame 120 and the movement prevention entry guide 140 may be provided in the main body case 110.

The sensor frame 120 may be installed on a rear inner surface of the main body case 110. The sensor frame 120 may include a pair of vertical frames 121 vertically disposed on the rear inner surface of the main body case 110 and a plurality of horizontal frames 124 horizontally disposed to be spaced apart from each other on the rear inner surface of the main body case 110.

The sensor frame 120 may have a structure in which the pair of vertical frames 121 and the plurality of horizontal frames 124 are disposed as shown in FIG. 7.

A vertical guide rail 122 may be installed in the vertical frame 121 in a longitudinal direction. The horizontal frame 124 may vertically move through the vertical guide rail 122 of the vertical frame 121. As the horizontal frame 124 vertically moves, the illuminance sensor 300 installed on the horizontal frame 124 may vertically move.

One or more illuminance sensors 300 may be installed on the horizontal frame 124. To this end, the horizontal frame 124 may be provided with the illuminance sensor 300 and a horizontal guide rail 125 provided in a longitudinal direction and may include a sensor position movement support 126 inserted into a groove 132 of the horizontal guide rail 125 to slide.

The sensor position movement support 126 may include a slide member 127 inserted into the groove 132 of the horizontal guide rail 125 to slide, an angle change connector 128, and an illuminance sensor portion 130.

The angle change connector 128 may be hinge-coupled to the slide member 127 and may support the illuminance sensor 300 attached to the illuminance sensor portion 130 to be laterally move. The illuminance sensor 300 may be vertically moved by vertical movement of the vertical frame 121 or the horizontal frame 124.

The illuminance sensor portion 130 may be provided with the illuminance sensor 300 and hinge-coupled to the angle change connector 128. In addition, the illuminance sensor portion 130 may provide an elastic force such that the illuminance sensor 300 may come into close contact with a surface of the inspection target product 10. For example, a spring may be provided to provide an elastic force to a connector 129 at which the illuminance sensor portion 130 is hinge-coupled to the angle change connector 128. The illuminance sensor 300 may be in close contact with the surface of the inspection target product 10 by the elastic force of the spring and measure an amount (illuminance value) of light transmitted from the inspection target product 10.

As shown in FIGS. 6A to 6C, the movement prevention entry guide 140 may be installed on a left surface and a right surface of the main body case 110.

The movement prevention entry guide 140 may be provided in the main body case 110 and guide the inspection target product 10 to enter the accommodation space 111 such that the inspection target product 10 is prevented from moving in a width direction.

As shown in FIG. 8, the movement prevention entry guide 140 may include a contact bar 141, an entry guide bar 143, and an interval adjustment connector 150.

A pair of contact bars 141 may be disposed in the accommodation space 111 to face each other and may be in contact with a peripheral surface of the inspection target product 10. A slide rail 142 may be formed in the contact bar 141 in a longitudinal direction.

The entry guide bar 143 may be provided with the illuminance sensor 300 and may be inclinedly connected to each contact bar to guide the inspection target product 10 to enter between the contact bars.

The entry guide bar 143 may be provided with one or more illuminance sensors 300. To this end, the entry guide bar 143 may be provided with the illuminance sensor 300 and a guide rail 144 provided in a longitudinal direction and may include a position-variable support 145 inserted into a groove of the guide rail 144 to slide.

The illuminance sensor 300 may be supported on the entry guide bar 143 by the position-variable support 145 to move in the longitudinal direction of the entry guide bar 143.

The position-variable support 145 may be slidably inserted into a groove of the guide rail 144 and move a position of the illuminance sensor 300.

The position-variable support 145 may include a slide member 146 inserted into the groove of the guide rail 144 to slide, an angle adjustment connector 147, and an illuminance sensor portion 148.

The angle adjustment connector 147 is formed to protrude from the slide member 146 and supports the illuminance sensor portion 148 to be vertically movable, thereby adjusting an angle of the illuminance sensor 300 attached to the illuminance sensor portion 148.

The illuminance sensor portion 148 may be provided with the illuminance sensor 300 and hinge-coupled to the angle adjustment connector 147. An angle of the illuminance sensor portion 148 may be vertically adjusted by the angle adjustment connector 147 to position the illuminance sensor 300 at a desired position.

The position-variable support 145 is moved in response to a control signal transmitted from the control device 200 or by an operator and allows the illuminance sensor 300 of the illuminance sensor portion 148 to measure an amount (illuminance) of light transmitted from the inspection target product 10.

The interval adjustment connector 150 may connect the contact bars 141 to the main body case 110 to be supported on the main body case 110 such that an interval between the contact bars 141 may be adjusted.

The interval adjustment connector 150 may include an operation knob 151 rotatably provided on a peripheral surface of the main body case 110, a rotation support 152 provided in the accommodation space 111 to rotatably support the contact bar 141, and an interval adjustment guide 154 that guides the rotation support 152 to move in a width direction of the accommodation space 111 as the operation knob 151 rotates.

The rotation support 152 may support the contact bar 141 to be slidable by the slide movement guide 153.

The slide movement guide 153 may include a slide member that is slidably inserted into a slide rail groove of the contact bar 141 and is hinge-connected to the rotation support 152.

The interval adjustment guide 154 may include a fastening shaft 155 provided at the operation knob 151 and passing through the main body case 110 to be connected to the rotation support 152, and a movement guide member 156 that is mounted on an inner surface of the main body case 110 to be fastened to the fastening shaft 155 and guides the axial movement of the fastening shaft 155.

The movement guide member 156 may include a fixing member 157 provided on the inner surface of the main body case 110, and a fastening hole 158 formed in the fixing member 157 and passing through the fastening shaft 155.

The movement prevention entry guide 140 having such a configuration may serve to hold and move the inspection target product 10 to prevent scratches when the inspection target product 10 is stored in the accommodation space 111. In addition, in the movement prevention entry guide 140, an angle of the illuminance sensor portion 148 may be adjusted to position the illuminance sensor 300 at a desired position, thereby allowing an amount of light transmitted from the inspection target product 10 to be measured through the illuminance sensor 300.

Meanwhile, the molding thickness inspection device 100 may accommodate one inspection target product 10 to measure illuminance of one inspection target product 10 or accommodate at least two inspection target products 10 to measure illuminance. In this case, the illuminance sensor 300 is not present on an upper surface and a lower surface between the inspection target products 10, and thus illuminance may not be measured.

When a plurality of inspection target products 10 are to be inspected at the same time, the molding thickness inspection device 100 according to one embodiment of the present invention may further include a compartment entry guide 160 that partitions the accommodation space 111 of the main body case 110 in a height direction.

The compartment entry guide 160 may guide the inspection target products 10 to enter the accommodation space 111 such that the accommodation space 111 may be partitioned in the height direction.

As shown in FIG. 9, the compartment entry guide 160 may include a compartment guide frame 161, a compartment sensor frame 162, a roller member 167, and a height adjustment connector 170 which are provided in the accommodation space 111.

The compartment sensor frame 162 may be connected to the compartment guide frame 161 and guide the illuminance sensor 300 such that a position thereof is movable.

The compartment sensor frame 162 may be provided with the illuminance sensor 300 and a guide rail 168 provided in a horizontal longitudinal direction and include a position-variable support 163 inserted into a groove of the guide rail 168 to slide.

At least two position-variable supports 163 may be provided. The position-variable support 163 may include a first position-variable support 163*a* that measures illuminance of light transmitted from a lower surface of the inspection target product 10 positioned at an upper side and accommodated at an upper portion of the compartment entry guide 160, and a second position-variable support 163*b* that measures illuminance of light transmitted from an upper surface of the inspection target product 10 positioned at a lower side and accommodated at a lower portion of the compartment entry guide 160.

The position-variable support 163 may be a component that moves the illuminance sensor 300 via a guide rail and may include a slide member 164 inserted into a groove of the guide rail 168 to slide an angle change connector 165 and an illuminance sensor portion 166.

The angle change connector 165 is formed to protrude from the slide member 164 and supports the illuminance sensor portion 166 to be laterally moved, thereby allowing an angle of the illuminance sensor 300 attached to the illuminance sensor portion 166 to be adjusted.

The illuminance sensor portion 166 may be provided with the illuminance sensor 300 and may be hinge-coupled to the angle change connector 165. In addition, the illuminance sensor portion 166 may provide an elastic force to the illuminance sensor 300 that comes into close contact with a surface of the inspection target product 10. For example, a spring may be provided to provide an elastic force to a connection portion at which the illuminance sensor portion 166 is hinge-coupled to the angle change connector 165. The illuminance sensor 300 may be in close contact with the surface of the inspection target product 10 by the elastic force of the spring and may measure an amount (illuminance value) of light transmitted from the inspection target product 10.

The position-variable support 163 is moved in response to a control signal transmitted from the control device 200 or by an operator and allows the illuminance sensor 300 of the illuminance sensor portion 166 to measure an amount (illuminance) of light transmitted from the inspection target product 10.

The roller member 167 may be rotatably supported on the compartment guide frame 161 and guide the movement of the inspection target product 10 entering the accommodation space 111.

The roller member 167 may be implemented in the form of a roller, a bead, or a ball and serve to move the inspection target product 10 to prevent scratches from occurring on the inspection target product 10.

The height adjustment connector 170 may connect the compartment guide frame 161 and the main body case 110 such that a height of the compartment guide frame 161 may be adjusted through a rotation operation by an external force.

The height adjustment connector 170 may include a fixing member 171, an elevation guide shaft 172, and a rotation elevation support 173.

A pair of fixing members 171 may be provided at both sides of the main body case 110 in a width direction to be spaced apart from each other.

The elevation guide shaft 172 may be provided at the fixing member 171 to pass through the compartment guide frame 161 and may guide the vertical movement of the compartment guide frame 161.

The rotation elevation support 173 may support the compartment guide frame 161 such that the compartment guide frame 161 is vertically moved through a rotation operation by an external force and a position thereof is fixed when the external force is removed.

The rotation elevation support 173 may include an operation knob 174 provided to be rotatably operated, a fastening shaft 175, and a fastening hole 176.

When the plurality of inspection target products 10 are accommodated, the compartment entry guide 160 having a such a configuration adjusts an interval between an upper portion and a lower portion of the accommodation space 111 and positions the illuminance sensor 300 on each of a lower surface of the inspection target product 10 positioned at an upper side and an upper surface of the inspection target product 10 positioned at a lower side, thereby allowing an amount of light transmitted from the inspection target product 10 to be measured.

For example, a case in which a first inspection target product 10*a* and a second inspection target product 10*b* having the same measurement point as shown in FIG. 10A are to be input to the molding thickness inspection device 100 will be described. In this case, the molding thickness inspection device 100 may be provided with the compartment entry guide 160, and when the first inspection target product 10*a* and the second inspection target product 10*b* are accommodated in the molding thickness inspection device 100, as shown in FIG. 10B, illuminance may be measured at measurement points of a lower surface of the first inspection target product 10*a* and an upper surface of the second inspection target product 10*b* by the compartment entry guide 160.

Figure 11:
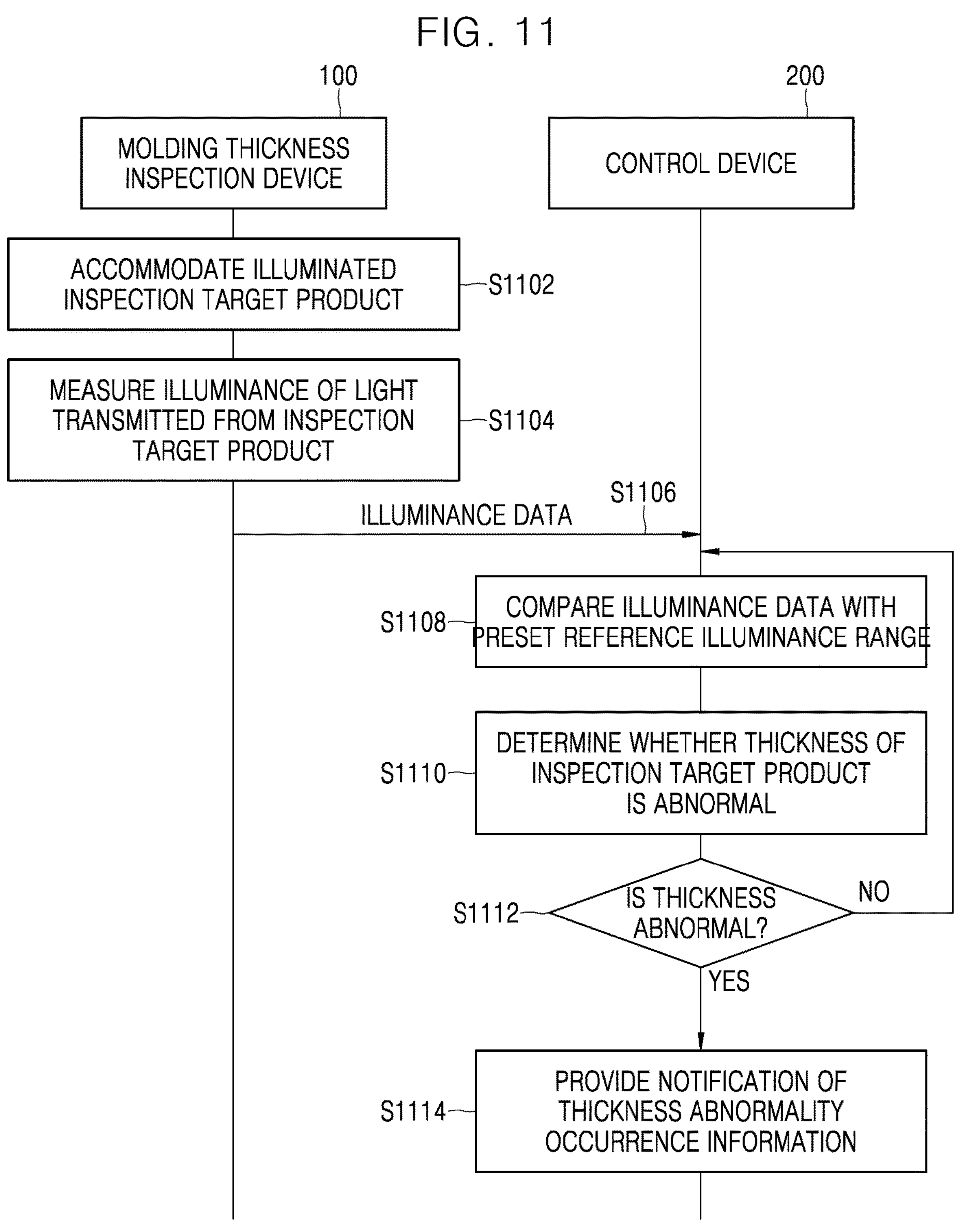
FIG. 11 is a flowchart for describing a molding thickness inspection method according to one embodiment of the present invention.

FIG. 11 is a flowchart for describing a molding thickness inspection method according to one embodiment of the present invention.

Referring to FIG. 11, when an illuminated inspection target product 10 is accommodated in a molding thickness inspection device 100 (S1102), illuminance sensors 300 of the molding thickness inspection device 100 measures illuminance of light transmitted from the inspection target product 10 (S1104) to transmit the measured illuminance to a control device 200 (S1106). That is, the illuminance sensors 300 may measure an illuminance value of light transmitted from the inspection target product 10 and transmit illuminance data including the measured illuminance value to the control device 200. Here, the illuminance data may include illuminance sensor identification information, the illuminance value, and the like.

When operation S1106 is performed, the control device 200 compares the illuminance data with a preset reference illuminance range (S1108) and determines whether a thickness of the inspection target product 10 is abnormal based on a comparison result (S1110). The control device 200 stores a look-up table in which a reference illuminance range is preset according to a measurement position for each inspection target product. Accordingly, the control device 200 may acquire a reference illuminance range of a position corresponding to illuminance sensor identification information included in illuminance data from the look-up table. Then, the control device 200 may compare an illuminance value included in the illuminance data with the reference illuminance range. When the illuminance value is in the reference illuminance range, the control device 200 may determine that the thickness at the corresponding position of the inspection target product 10 is normal. When the illuminance value is out of the reference illuminance range, the processor 250 may determine that the thickness at the corresponding position of the inspection target product 10 is defective.

When the thickness is abnormal as a determination result in operation S1110 (S1112), the control device 200 notifies an operator of thickness abnormality occurrence information (S1114). In this case, the control device 200 may notify the operator of the thickness abnormality occurrence information by displaying a position at which the thickness is abnormal through an output module 240.

As described above, according to an aspect of the present invention, whether a thickness of an inspection target product is abnormal is determined based on illuminance data measured through an illuminance sensor installed in a molding thickness inspection device, thereby objectively, concisely, and quickly confirming the quality of the inspection target product and improving productivity in a factory.

In addition, according to an aspect of the present invention, in the present invention, the number or position of illuminance sensors installed in a molding thickness inspection device is changed automatically or manually according to an inspection target product, thereby allowing the molding thickness inspection device to be used to inspect a molding thickness of various products.

The present invention has been described with reference to embodiments shown in the drawings, but this is merely illustrative, and those skilled in the art will understand that various modifications and other equivalent embodiments are possible therefrom.

Therefore, the true technical protection scope of the present invention should be defined by the appended claims.

What is claimed is:

1. A molding thickness inspection system comprising:

a molding thickness inspection device in which a plurality of illuminance sensors are installed and which accommodates an inspection target product which is illuminated; and a control device configured to inspect whether a thickness of the inspection target product is abnormal based on illuminance data measured by the plurality of illuminance sensors, wherein each of the plurality of illuminance sensors includes illuminance sensor identification information, and wherein the plurality of illuminance sensors are movable, and are respectively moved in response to a control signal of the control device.

2. The molding thickness inspection system of claim 1, wherein, when the illuminance data is received from the plurality of illuminance sensors through a communication module, the control device compares the illuminance data with a preset reference illuminance range, when the illuminance data is in the preset reference illuminance range, determines that the thickness of the inspection target product is normal, and when the illuminance data is out of the reference illuminance range, determines that the thickness of the inspection target product is defective.

3. The molding thickness inspection system of claim 2, wherein the illuminance data includes the illuminance sensor identification information and an illuminance value, and the control device acquires a reference illuminance range at a position corresponding to the illuminance sensor identification information from a look-up table in which a reference illuminance range is set according to a position for each product, and compares the illuminance value with the acquired reference illuminance range to inspect a thickness for each position of the inspection target product.

4. The molding thickness inspection system of claim 2, wherein, when it is determined that the thickness of the inspection target product is defective, the control device outputs thickness abnormality occurrence information of the inspection target product through an output module.

5. The molding thickness inspection system of claim 2, wherein, when the inspection target product is selected through an input module, the control device acquires measurement point information corresponding to the selected inspection target product and transmits the control signal for moving the illuminance sensor to a position corresponding to the measurement point information.

6. The molding thickness inspection system of claim 5, wherein the molding thickness inspection device moves each illuminance sensor to a corresponding position according to the control signal from the control device.

7. A molding thickness inspection method comprising:

receiving, by a control device, illuminance data from each of a plurality of illuminance sensors of a molding thickness inspection device in which an inspection target product, which is illuminated, is accommodated; and inspecting, by the control device, whether a thickness of the inspection target product is abnormal based on the illuminance data, wherein each of the plurality of illuminance sensors includes illuminance sensor identification information, and wherein the plurality of illuminance sensors are movable, and are respectively moved in response to a control signal of the control device.

8. The molding thickness inspection method of claim 7, wherein, in the inspecting, the control device compares the illuminance data with a preset reference illuminance range, when the illuminance data is in the preset reference illuminance range, determines that the thickness of the inspection target product is normal, and when the illuminance data is out of the reference illuminance range, determines that the thickness of the inspection target product is defective.

* * * * *